United States Patent Office 2,827,448
Patented Mar. 18, 1958

2,827,448

TREATMENT OF COPALS

Louis Lacroix, Brussels, Belgium, assignor to Gino Vuagnat, Geneva, Switzerland

No Drawing. Application November 10, 1955
Serial No. 546,280

Claims priority, application Belgium November 23, 1954

2 Claims. (Cl. 260—97)

This invention relates to a process for the treatment of unrefined resin copal, and more particularly to a process whereby copal can be transformed into a state which is most favorable for its use in the production of lacquers, varnishes, linoleum, amber substitutes, plastics and like products.

A variety of processes are known in the art whereby raw copal can be transformed into a substance which lends itself readily for inclusion in a resinous composition such as lacquer and the like. These prior art processes, however, are generally rather complicated and for one reason or another not well adapted to use on an industrial scale.

I have discovered a greatly simplified method of bringing about the above transformation, which may readily be applied to large-scale industrial production conditions. Moreover, the desired end product is obtained very rapidly and the results produced therewith are more than satisfactory.

Quite generally stated, the advantages of my process over those disclosed by the prior art are achieved by closely inter-relating certain mechanical, physical and chemical phases in the treatment of copal, under conditions whereby the mechanical and physical phases assume the nature of a preparatory treatment for the subsequent chemical phase and make the copal more susceptible to the effect of the chemical agent.

More particularly, the process according to the present invention comprises first finely comminuting the raw resin copal by any suitable mechanical means, for example in a pulverizing mill. Thereafter, the powdered copal is loosened up or diffused in order to separate the small copal particles from each other and thereby offer the chemical agent in the subsequent chemical phase of the treatment as large a contact surface as possible. Finally, the fluffed up copal powder is admixed or otherwise brought in contact with at least one aldehyde, for example with an aldehyde derived from methyl alcohol, preferably in the presence of an acid or alkaline substance. The resulting product is then washed with water and dried, dissolved in a solvent such as n-butyl alcohol and the resultant solution distilled to remove the solvent.

The physical portion of this treatment, i. e. the fluffing or diffusing step, can be enhanced by a simultaneous thermal treatment, for example by suspending the copal powder in water and heating the suspension to a temperature preferably not exceeding 60° C. Under those conditions the chemical phase of the treatment does not need to last for more than about 60 minutes. Without the thermal treatment, it is generally necessary to expose the copal powder to the action of the aldehyde for more than six hours.

Despite the relative rapidity with which those treatment phases may be carried out, the resinous products obtained thereby are excellent starting materials for the manufacture of lacquers, varnishes, linoleum, amber substitutes, plastic and the like.

The process in accordance with the present invention is not only much simpler than the methods disclosed by the prior art but also very flexible, because the beneficial results are independent of the type of aldehyde used or the nature of the substance which is used to change the neutral reaction of the copal-aldehyde mixture to an acid or alkaline reaction.

The fact that the process herein disclosed is so much simpler than the methods already known in the industry makes the manufacturing cost of the ultimate product comparatively low. In addition, the number of reagents used in the process is small, their cost is low, and the yield of refined copal is very high.

The following example will further illustrate my invention and enable others skilled in the art to understand it more completely. There is no intention on my part, however, to limit my invention to this particular example.

*Example*

250 gm. raw resin copal were ground in a pulverizer until a powder was formed which passed in its entirety through a screen of 160 mesh per 6.45 cm.$^2$ The copal powder was then diffused by suspending it in an aqueous bath. The temperature of this suspension was maintained between 40 and 60° C. for a period of about 45 minutes to 1 hour. Thereafter, 25 gm. formaldehyde and 2% by weight acetic acid or borax, based upon the weight of raw copal, were added to the warm suspension. After about one hour the solid product was filtered off, washed with water at about 40° C. and dried. The dry product was then dissolved in n-butyl alcohol and the solution was distilled to remove the solvent. The resulting product was a resinous substance which was readily and directly incorporated into a lacquer composition.

While I have given a specific embodiment of my invention, it will be obvious to persons skilled in the art that various changes and modifications may be made without departing from the spirit of the invention or the scope of the appended claims. For example, it is not necessary to employ the particular materials and compounds recited in the specification, or the specific quantitative ratios given. The type of material and the quantitative ratios given may readily be substituted by equivalent materials and varied, respectively, to meet the requirements of the desired end products. Similarly, a variety of different solvents may be used, depending upon the particular type of product being treated; also, various types of apparatus may be employed for washing the chemically treated copal powder and for the distillation of the solvent solution. As a further example of the many possible variations, it is in some cases permissible to omit the fluffing treatment and expose the comminuted copal directly to the action of the aldehyde in the presence of materials which make the normally neutral raw copal either acidic or alkaline.

I claim:

1. Process for the treatment of copal, which comprises the steps of pulverizing raw copal, suspending the powder in water at a temperature between 40 and 60° C., admixing said suspension with formaldehyde, allowing the mixture to stand for about one hour, in the presence of 2% by weight of a compound capable of removing the neutral reaction of the suspension selected from the group consisting of borax and acetic acid, separating the resulting copal product from the suspension, washing and drying the copal product, dissolving said dry copal product in n-butyl alcohol, filtering the alcohol solution and distilling the filtrate until the alcohol is separated from said copal product.

2. Process for the treatment of copals, which comprises the steps of comminuting raw copal, suspending the comminuted copal in warm water, adding to said aqueous suspension formaldehyde and a compound capable of removing the neutral reaction of the suspension selected from the group consisting of borax and acetic acid, separating the resultant copal product from the suspension, washing and drying the copal product, dissolving the dry copal product in an organic solvent, filtering the resulting solution and evaporating the filtrate to dryness.

References Cited in the file of this patent

UNITED STATES PATENTS

| | | |
|---|---|---|
| 1,243,312 | Low | Oct. 16, 1917 |
| 1,973,489 | Kocher | Sept. 11, 1934 |
| 2,007,333 | Krumbhaar | July 9, 1935 |
| 2,101,398 | Krumbhaar | Dec. 7, 1937 |

FOREIGN PATENTS

| | | |
|---|---|---|
| 425,366 | Great Britain | Mar. 13, 1935 |

OTHER REFERENCES

Bhattacharya: "The Derivatives of Natural Resins and Their Polymerization," Chemistry and Industry, pages 325–328, May 11, 1940.

Mantell et al.: "Solubilities of Natural Resins in Solvents and Waxes," Industrial and Engineering Chemistry, vol. 30, No. 3, March 1938, pages 262–269.